US008545647B2

(12) United States Patent
Ash et al.

(10) Patent No.: US 8,545,647 B2
(45) Date of Patent: Oct. 1, 2013

(54) ITEM OF HARDWARE AND METHOD OF MAKING AND BONDING SAME

(75) Inventors: Charles E. Ash, Perrysburg, OH (US); Julia B. MacLachlan, Toledo, OH (US); Scott W. Chambers, Perrysburg, OH (US)

(73) Assignee: Pilkington Group Limited, St. Helens (GB)

( * ) Notice: Subject to any disclaimer, the term of this patent is extended or adjusted under 35 U.S.C. 154(b) by 359 days.

(21) Appl. No.: 12/942,070

(22) Filed: Nov. 9, 2010

(65) Prior Publication Data

US 2011/0117370 A1 May 19, 2011

Related U.S. Application Data

(60) Provisional application No. 61/262,694, filed on Nov. 19, 2009.

(51) Int. Cl.
*B32B 37/00* (2006.01)
(52) U.S. Cl.
USPC ............................................. 156/60
(58) Field of Classification Search
USPC ................................... 156/60, 325
See application file for complete search history.

(56) References Cited

U.S. PATENT DOCUMENTS

| | | | |
|---|---|---|---|
| 4,167,259 A | 9/1979 | Bury | |
| 4,488,777 A * | 12/1984 | Bauer et al. | 359/604 |
| 4,822,656 A | 4/1989 | Hutter, III | |
| 5,551,197 A | 9/1996 | Repp et al. | |
| 5,587,236 A * | 12/1996 | Agrawal et al. | 428/334 |
| 5,589,026 A * | 12/1996 | Perecman | 156/286 |
| 5,704,173 A | 1/1998 | Repp et al. | |
| 5,853,895 A | 12/1998 | Lewno | |
| 5,883,193 A * | 3/1999 | Karim | 525/113 |
| 5,966,874 A | 10/1999 | Repp et al. | |
| 6,001,204 A * | 12/1999 | Halg et al. | 156/108 |
| 6,068,719 A | 5/2000 | Lewno | |
| 6,128,860 A | 10/2000 | Repp et al. | |
| 6,133,398 A * | 10/2000 | Bhat et al. | 528/60 |
| 6,298,606 B1 | 10/2001 | Repp et al. | |
| 6,319,344 B1 | 11/2001 | Lewno | |
| 6,846,039 B2 | 1/2005 | Lewno | |
| 6,871,450 B2 | 3/2005 | Repp et al. | |
| 7,332,225 B2 | 2/2008 | Lewno | |
| 7,360,338 B2 | 4/2008 | Repp et al. | |

FOREIGN PATENT DOCUMENTS

DE 102006010392 9/2007
EP 0 900 944 A1 3/1999

* cited by examiner

*Primary Examiner* — Jeff Aftergut
(74) *Attorney, Agent, or Firm* — Marshall & Melhorn, LLC

(57) ABSTRACT

The present application describes and claims an item of hardware suitable for bonding to a substrate such as a vehicle glazing. The item of hardware of the invention helps to ensure that the adhesive applied is effectively contained and utilized for its intended purpose. A preferred type of adhesive is also described and claimed.

3 Claims, 8 Drawing Sheets

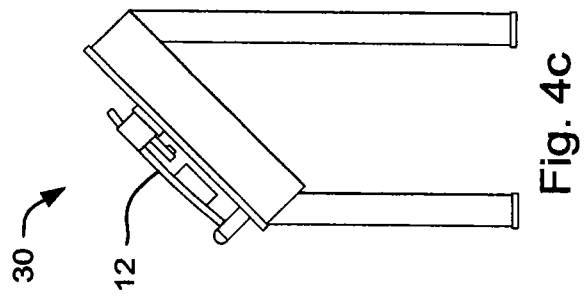
Fig. 4c
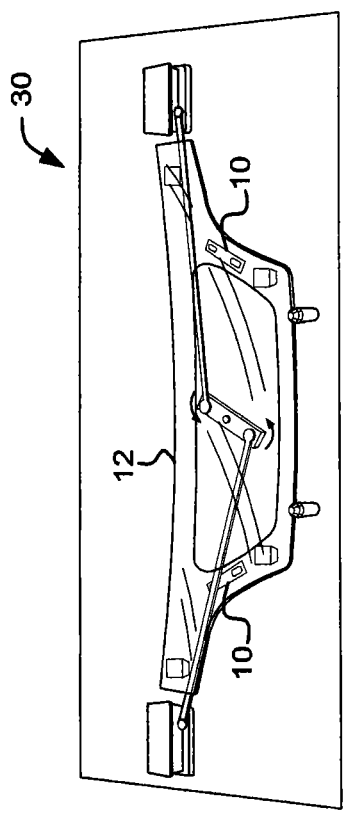
Fig. 4a
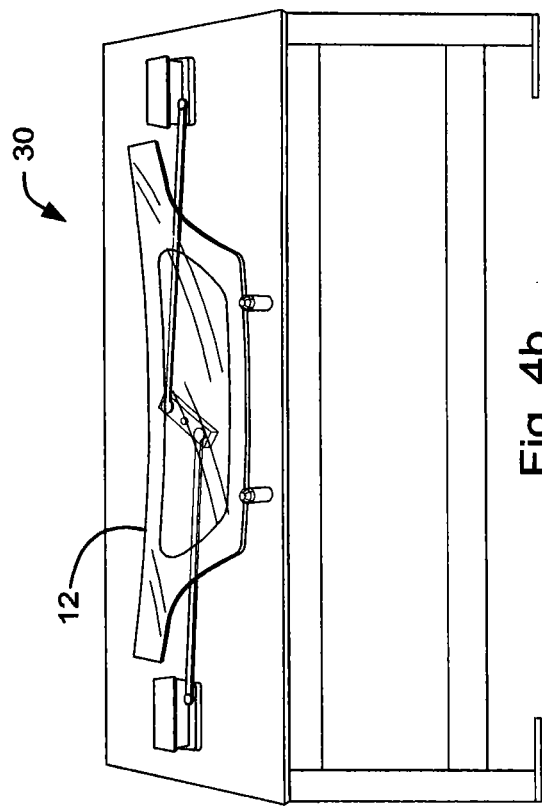
Fig. 4b
Fig. 4

ITEM OF HARDWARE AND METHOD OF MAKING AND BONDING SAME

RELATED APPLICATION

This application is claiming the benefit, under 35 U.S.C. 119(e), of the provisional application filed Nov. 19, 2009 under 35 U.S.C. 111(b), which was granted Ser. No. 61/262,694. This provisional application is hereby incorporated by reference in its entirety.

BACKGROUND

The present invention relates to an item of hardware adapted to be bonded to a substrate and, once bonded, to perform a useful mechanical function.

In many modern vehicles, various items are adhesively bonded to the vehicle windows, which are, typically, made of flat or shaped sheets of glass. Various methods of applying adhesive onto the item to be bonded or onto a predetermined location on the glass, have been utilized, with varying degrees of success. Many such methods involve the manual application of the adhesive materials, with the attendant problems of any repetitive manual manufacturing operation. Additionally, the labor costs of such manual operations have become unacceptably high in at least some applications.

More recently, automated methods of applying adhesive materials have been utilized. The precision and reliability of such automated systems has reached the point that they can reasonably be utilized to rapidly apply quite small amounts of adhesive in a small area for the purpose of, for example, bonding an item of hardware onto the glass sheet of a vehicle window assembly. Notwithstanding the improvements made in automated adhesive application systems, they are still not perfect, and it would be desirable to have an item of hardware which can compensate for certain deficiencies in the application systems.

Items of hardware to be adhesively bonded to glass substrates and methods of doing same have been described in the patent literature, for example:

U.S. Pat. No. 4,167,259 describes a device adapted to be adhesively secured to a primary work surface to facilitate the securement of a secondary work piece to said primary work surface. Heat and pressure are required to bond the device to the work surface.

U.S. Pat. Nos. 5,853,895, 6,068,719, 6,319,344, 6,846,039 and 7,332,225, all related patents, describe a bonded vehicular glass assembly utilizing a two-component urethane adhesive to attach an attachment member to a glass panel to form a joint suitable for use on a vehicle. The attachment member may be a hinge, a latch or the like. Related methods of forming a joint and of attaching components to vehicular glass assemblies by use of the adhesives are also described.

U.S. Pat. Nos. 5,551,197, 5,704,173, 5,966,874, 6,188,860, 6,298,606, 6,871,450, and 7,360,338, all related patents, describe a flush-mounted articulated window assembly for use in a vehicle. The window assembly includes a transparent sheet with at least one window-mounting member bonded by two separate adhesives to an inner surface of the sheet. The mounting member includes projections which space the mounting member from the inner sheet surface, and/or perforations which allow air and moisture to reach the space provided between the mounting member and the inner sheet surface.

SUMMARY OF THE INVENTION

The present invention relates to an item of hardware adapted to be adhesively bonded to the glass surface of a vehicle window assembly. More specifically, the item of hardware of the invention is compatible with automated adhesive application systems. A method of making and bonding the item of hardware is also disclosed.

The item of hardware of the present invention includes an integral housing portion, which integral housing portion includes a hardware functional portion which can serve any of a number of useful mechanical functions such as serving as a clevis, a pin, a bracket, a hinge, a latch, and decorative trim. Additionally, the integral housing portion includes a housing peripheral portion extending from the hardware functional portion, the housing peripheral portion containing a base plate having one or more adhesion-enhancing openings formed therein. The base plate is oriented substantially parallel to the surface of the substrate to which it is to be bonded. Extending from the housing peripheral portion is a continuous housing peripheral extension portion which contacts the surface of the substrate to which the item of hardware is to be bonded. In so contacting the substrate surface, the housing peripheral extension portion exerts a uniform pressure of about 6,000-8,000 psi for windshields and about 20,000-24,000 psi for tempered glass on any portion of the substrate, the maximum desired pressure being dependent on glass thickness, and also preferably maintains the base plate a predetermined vertical distance (dv) above the substrate surface.

A preferred adhesive for bonding the item of hardware to the substrate is a one-component polyurethane adhesive. A method for bonding relatively large items of hardware to, for example, a roof window in a vehicle is also provided.

BRIEF DESCRIPTION OF THE DRAWINGS

The objects and advantages of the invention will become apparent upon reading the following detailed description and upon reference to the drawings.

FIG. 4 is a perspective view of an exemplary fixture into which an item of hardware according to any embodiment herein, may be positioned on and bonded to a glass substrate.

DETAILED DESCRIPTION OF THE INVENTION

The present invention relates to an item of hardware adapted to be adhesively bonded to a substrate, such as the glass surface of a vehicle window assembly. More particularly, the present invention relates to an item of hardware which can be advantageously utilized in automated manufacturing operations in which, for example, both the adhesive material and the item of hardware are dispensed/applied by electro-mechanical devices such as robots. A method of making the item of hardware of the present invention and bonding it to the substrate is also an aspect of the invention. The use of an innovative one-component urethane adhesive suitable for structural purposes is an additional aspect of the invention.

Figure 1:
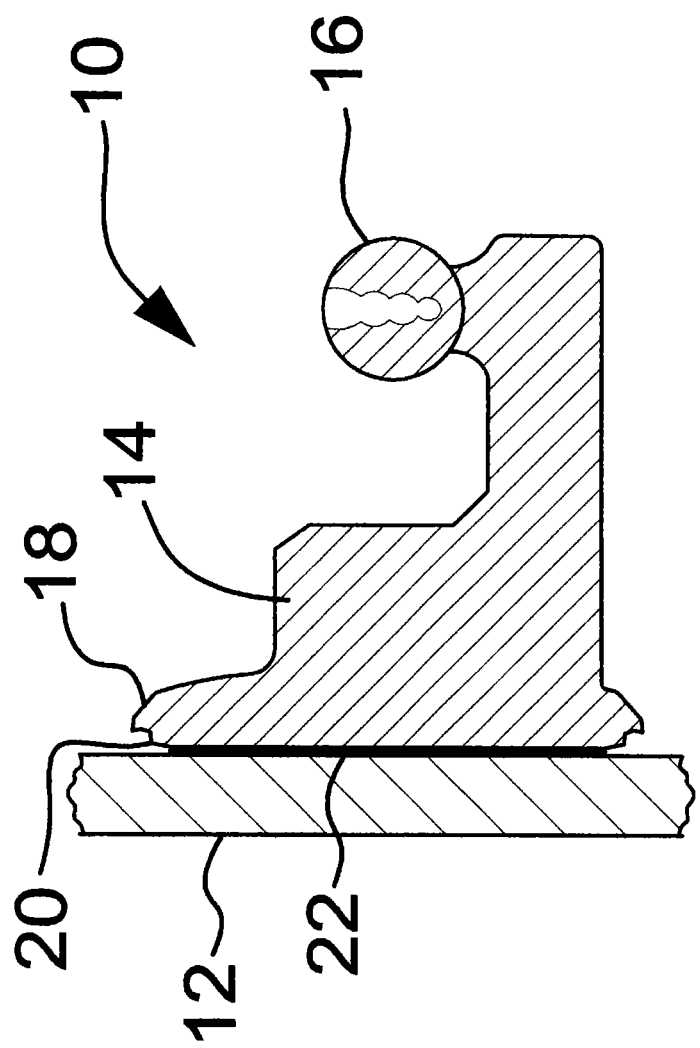
FIG. 1 shows a cross-sectional view of an exemplary item of hardware according to a first embodiment of the present invention.
Figure 2:
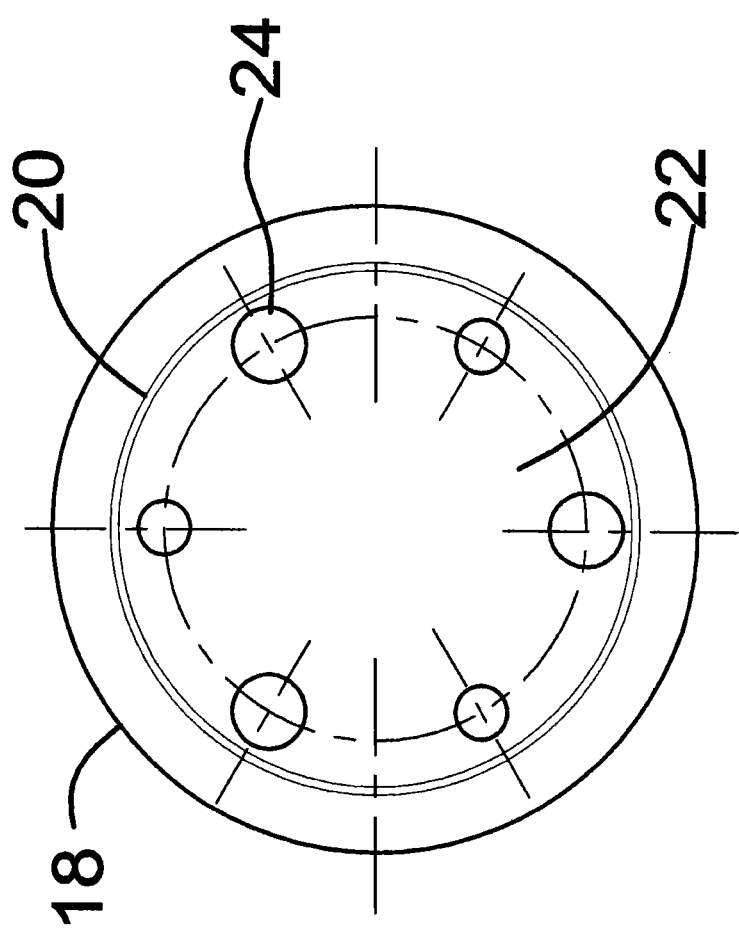
FIG. 2 shows a plan view of the base plate according to the first embodiment of the invention.

A first embodiment of the invention is first illustrated in FIGS. 1 and 2. An item of hardware 10 adapted to be adhesively bonded to a substrate 12 has an unified or integrated structure including an integral housing portion 14 which may, for descriptive purposes, be divided into a hardware functional portion 16, a housing peripheral portion 18 which extends from the hardware functional portion 16, and a continuous housing peripheral extension portion 20 extending from housing peripheral portion 18. The housing peripheral extension portion 20 contacts the surface of the substrate 12 to which the item of hardware 10 is to be bonded, and exerts a desirably uniform pressure thereon, but the housing peripheral extension portion 20 is itself not adhesively bonded to substrate 12. A base plate 22 is integrally formed within housing peripheral portion 18 and has one or more adhesion-enhancing openings 24 formed therein. As the base plate 22 is intended to serve as the primary area of adhesive contact with the surface of substrate 12, it is oriented substantially parallel to the substrate surface 12, in order to maximize the area available for such adhesive contact. Preferably, the housing peripheral extension portion 20, which extends from the housing peripheral portion 18 and thus from the base plate 22, will maintain the base plate 22 a predetermined vertical distance (dv) above substrate surface 12. Further, distance dv may be substantially equivalent to the nominal thickness of adhesive material (ta) established when bonding an item of hardware 10 to substrate 12 occurs. The housing peripheral extension portion 20, in continuous form, also serves as a means of containing the lateral spread of adhesive material applied to item of hardware 10, onto substrate 12 when bonding the two together.

Figure 3:
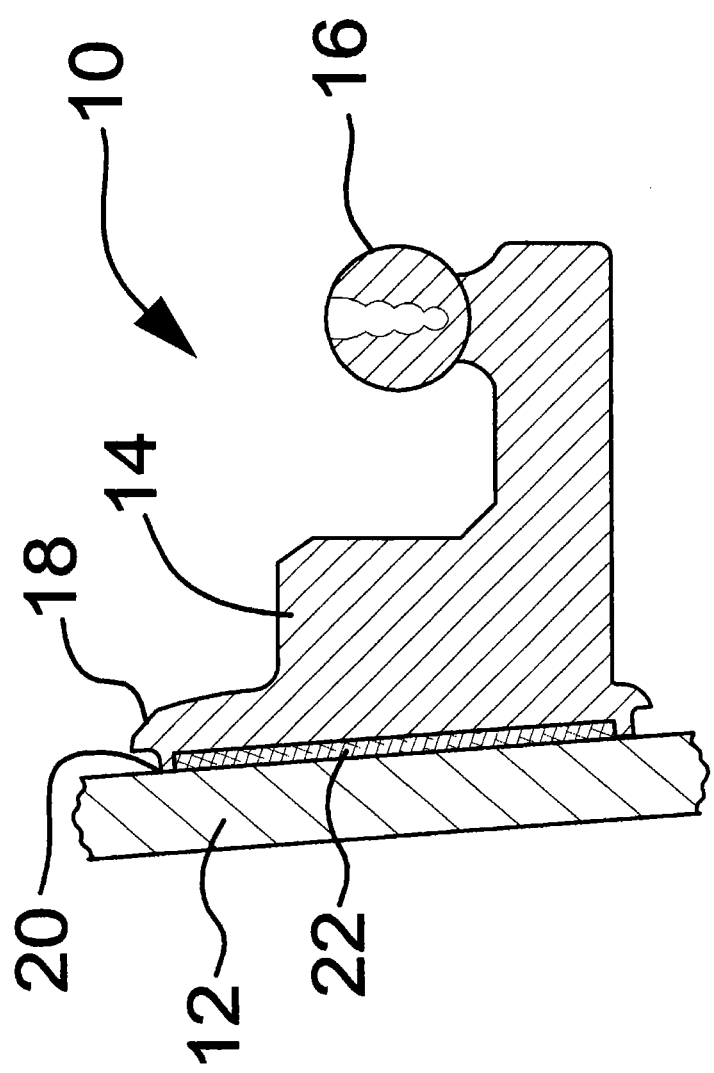
FIG. 3 shows a cross-sectional view of an exemplary item of hardware according to the first embodiment, wherein the housing peripheral extension portion has a differential height around its periphery.

It is within the scope of the invention for the continuous housing peripheral extension portion 20 to be uniform in height around its entire peripheral extent, or to be non-uniform in height to better conform to contoured areas of a shaped glass substrate. See for example FIG. 3. In some circumstances, it may even be desirable for the housing peripheral extension portion 20 to be discontinuous in order to be able to observe certain aspects of the adhesive layer for quality control purposes. Obviously, in such configuration the adhesive containment function of the continuous housing peripheral extension portion 20 is compromised.

Items of hardware, in any embodiment may be made from metal, coated metal, plastic, and combinations thereof, or any other suitable material.

As shown in FIG. 4, rather than item of hardware 10 being self-positioning with respect to substrate 12, by virtue of the housing peripheral extension portion 20, the item of hardware may be placed in a fixture 30. The glass substrate 12 is also placed in the fixture 30, which serves to position item of hardware 10 relative to substrate 12, thus establishing distance (dv) and establishing nominal adhesive thickness (ta) for a particular vehicle window assembly.

An aspect of the invention encompasses a method of bonding the integrally formed item of hardware 10 to substrate 12, where the item of hardware 10 is as previously described herein, including manually or robotically applying a controlled amount of an adhesive onto the baseplate 22 of the item of hardware, or onto a predetermined location on glass substrate 12. As previously mentioned, it is desirable to apply a sufficient amount of a type of adhesive which builds strength quickly, but not an excessive amount of adhesive, so as to reduce waste and expense. When the baseplate 22 has adhesion-enhancing openings 24, excess adhesive may be beneficially utilized by entering the adhesion enhancing openings 24. More specifically, the method of the present invention provides for certain limits on the maximum amount of adhesive to be applied relative to the minimum amount necessary to form a bond sufficient to prevent "creep" of the item of hardware within 2 minutes of bonding contact having been made. A difference of 20% or less between the maximum and the minimum amount of adhesive is preferred. By performing the method set forth, the vertical distance of baseplate 22 above substrate 12 establishes nominal adhesive layer thickness (ta) there-between.

In practicing the method of the invention, various types of adhesives such as epoxy and acrylic adhesives, may suitably be used. It is, however, preferred to utilize a polyurethane adhesive, more preferably a one-component polyurethane adhesive, and even more preferably, a one-component polyurethane adhesive including at least one polymer polyol and at least one latently reactive component dispersed in the polyol at a stoichlometric ratio of for example, between 10 wt % to 90 wt. % and 90 Wt. % to 10 wt %. The adhesive preferably has a long "open time", preferably 24 hours or more, and exhibits accelerated curing upon exposure to moderate temperatures, for example, at a temperature of a minimum of 170° F., the adhesive will cure to 40% of its final bond strength in 1 minute or less.

Figure 5:
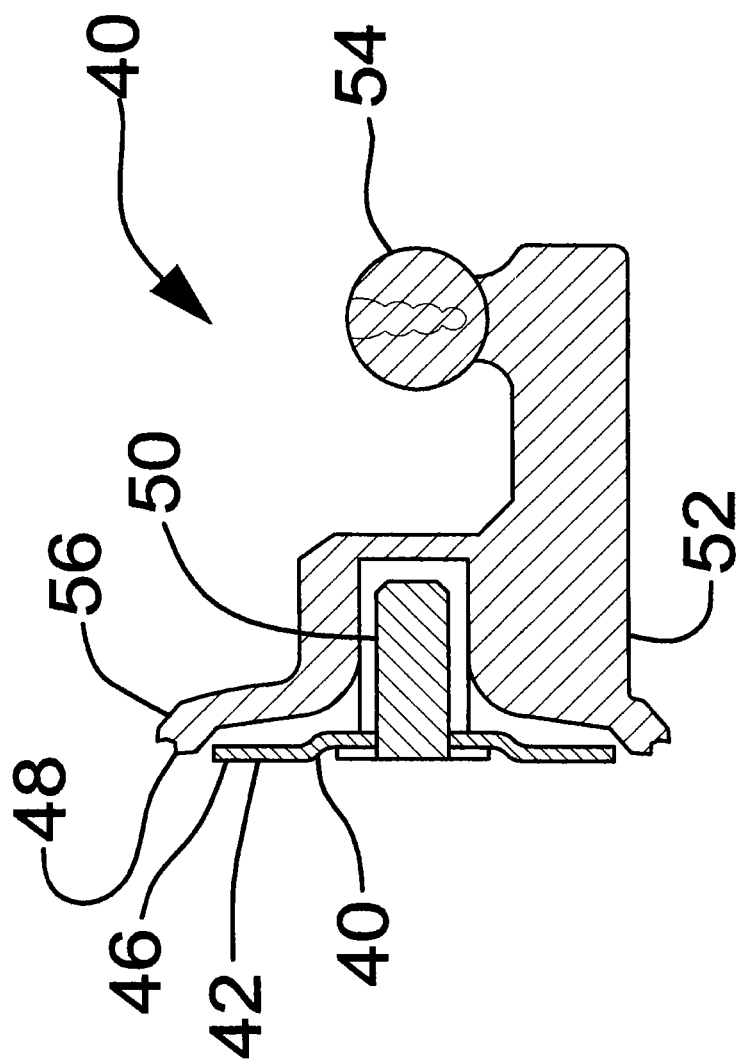
FIG. 5 shows a cross-sectional view of an exemplary item of hardware according to a second embodiment of the present invention.
Figure 6:
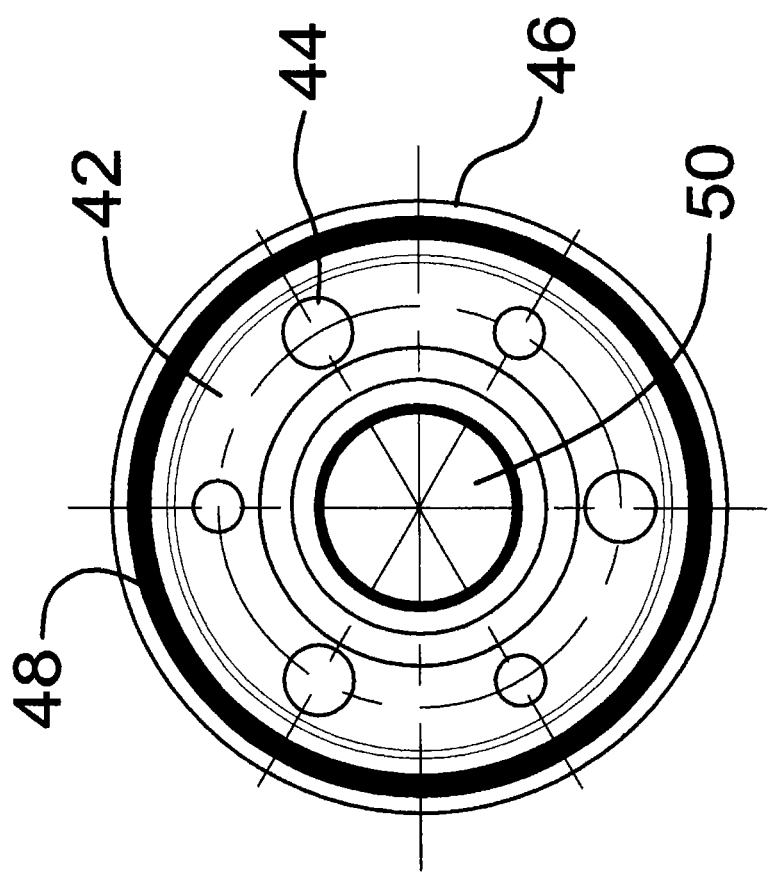
FIG. 6 shows a plan view of the base plate with the housing peripheral extension portion laterally spaced from the periphery of the base plate according to a second embodiment of the invention.
Figure 7:
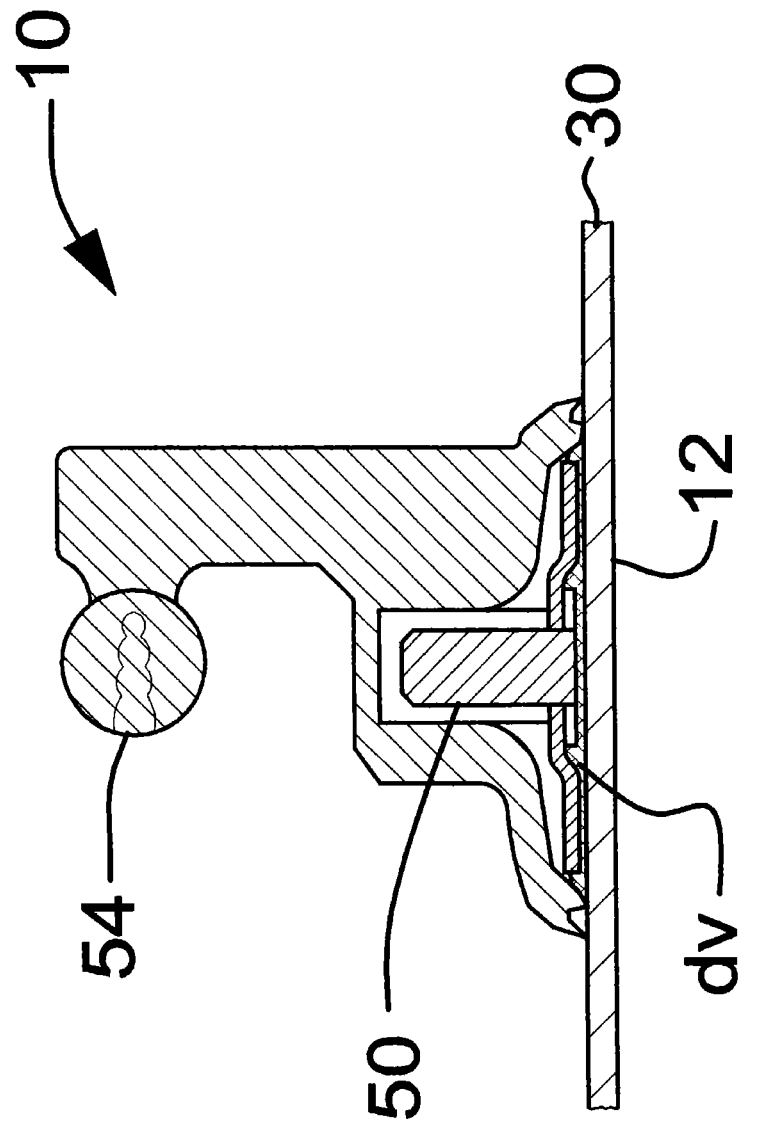
FIG. 7 shows a cross sectional view of an exemplary item of hardware in contact with a substrate according to a second embodiment of the invention.

Referring to FIG. 5, in a second embodiment of the invention, a base plate 42 preferably made of metal, but possibly made of plastic or other suitable material, has a plurality of adhesion-enhancing openings (not shown), spaced about the periphery 46 thereof. Additionally, the base plate 42 has a centrally located opening 48 therein for receipt of a connecting member 50, preferably an elongate connecting member 50 such as a bolt, a screw or other suitable mechanical fastener made of metal, plastic or other suitable material. Although not required, other desirable features to enhance adhesion can be formed in the base plate 42.

With continuing reference to FIG. 5, it can be seen how the base plate 42 just described is connected by elongate connecting member 50 to housing portion 52 of the item of hardware. More specifically, housing portion 52 includes a hardware functional portion 54 which can serve any of a number of useful mechanical functions, such as a clevis, a pin, a bracket, a hinge, a latch, and the like, or as decorative trim.

The housing portion also includes a housing peripheral portion 56 which extends from the hardware functional portion 54. The housing peripheral portion 56 contains the base plate 42, and is peripherally proximate, but spaced laterally apart, a predetermined distance from the periphery 46 of the base plate 42. Extending from the housing peripheral portion 46 is a continuous housing peripheral extension portion 48 which is intended to contact the surface of the substrate 60 to which the item of hardware is to be bonded.

Preferably, the hardware functional portion 44, the housing peripheral portion 46, and the housing peripheral extension portion 48 integrally form housing portion 42, for example, housing portion 42 may be an integrally molded, one-piece plastic device. Housing portion 42 may, however, be integrally formed from other suitable materials such as metal, or may be formed by assembly of component parts formed of a combination of metal, plastic and the like.

Figure 8:
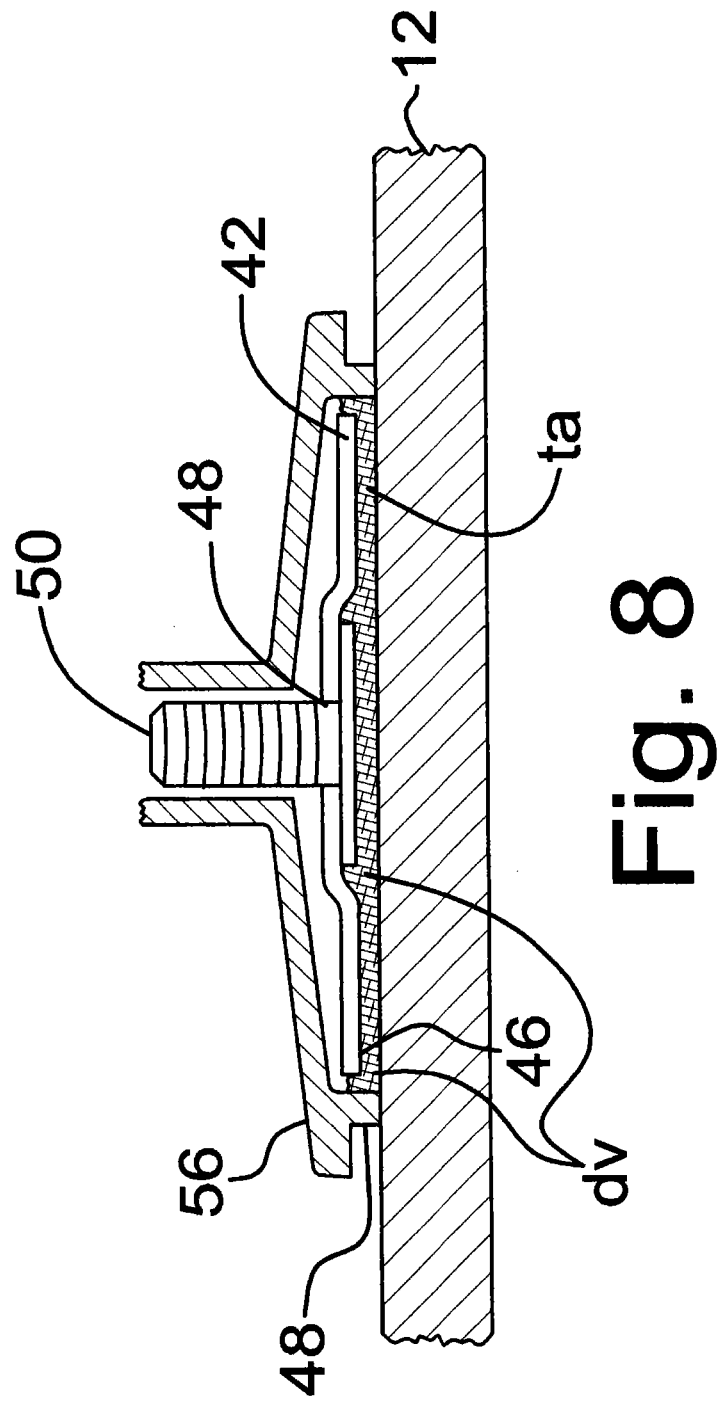
FIG. 8 shows an exploded view of a portion of the item of hardware according to a second embodiment of the invention. (not to scale to show layer of adhesive in relation to base plate and substrate.)

The continuous housing extension portion 48 makes the item of hardware 40 of the present invention particularly advantageous for use with automated adhesive application systems and automated systems for placing the item of hardware 40 in bonding contact with the applied adhesive on a substrate surface 12, preferably the glass surface of a vehicle window assembly. When the continuous housing extension portion 48 is brought into contact with a location on the glass substrate where an amount of adhesive has been applied, (see for example, FIG. 8) the continuous housing extension portion 48 effectively controls the horizontal and vertical extent (ta) of the adhesive material. By not allowing the adhesive to horizontally spread beyond the extent of the continuous housing extension portion 48, it does not mar the appearance of the vehicle window assembly, and the full amount of the adhesive applied, thus contained, is used for its intended purpose of bonding the item of hardware to the substrate surface.

Beyond aesthetic considerations, controlling the vertical extent (ta), or establishing a nominal thickness, of the adhesive material is important in determining the strength of the adhesive bond formed between the item of hardware and the surface of the substrate. This principle is known from for example *Mechanical Behavior of Adhesive Joints*, G. Verchery and A. H. Caredon, Editions Pluralis, pg. 7-8 (1987). As those skilled in the art will appreciate the continuous housing peripheral extension portion 28, 48 forms a "skirt" to perform the various functions described above. In doing so, the continuous housing peripheral extension portion 28, 48 obviates the need for standoffs or the like being formed in base plate 12, 42.

The amount of adhesive material applied is desirably balanced between the cost of utilizing more adhesive than is necessary, and ensuring that sufficient adhesive is applied to create a strong bond between the item of hardware and the substrate material. With automated adhesive application systems, the amount of adhesive found to strike this balance for the purposes described herein is typically between 0.5 g and 20.0 g, preferably between 0.8 g and 15.0 g. The nominal vertical thickness (ta) achieved by use of such quantity of adhesive in combination with the item of hardware of the invention is preferably between 0.5 mm and 5 mm.

While various adhesive application systems can be used in connection with the present invention, it would be desirable to use an automated adhesive application system such as those available from EMCC, Sterling Heights, Mich. As is well known to those skilled in the art, the use of multi-component adhesives creates a number of issues, including having to provide multiple delivery systems, mixing/metering equipment to insure proper combination of the various adhesive components and the like. One-component adhesive systems could mitigate some of the above-described issues, but known one-component adhesive systems typically do not have sufficient early bond strength for structural purposes such as adhering items of hardware, or do not have sufficient open time, storage time, or the like. Accordingly, another aspect of the invention is to enhance adhesive bonding processes for items of hardware to glass substrates by, preferably utilizing a one-component urethane adhesive system which overcomes the deficiencies of previously known one-component adhesives for bonding, for example, items of hardware, to a substrate.

A one-component adhesive particularly suitable for use in connection with the present invention is a polyurethane adhesive preferably including at least one polymer polyol, such as the adhesives known as Terolan 1510™ HA315 by Henkel and Efbond™ by Eftec, and at least one physically unincorporated or chemically blocked polymerizing component, such as an isocyanate compound, well dispersed within the at least one polymer polyol. The polymerizing component may comprise a percentage of the overall adhesive of, for example, 1 wt % to 50 wt % of the total adhesive. An advantage of the present type of adhesive is that it has an initial viscosity which, unless subjected to heat at a temperature of 190° F. or greater, will maintain a viscosity substantially within the range of the initial viscosity for an indefinite period of time. Such material is pumpable, or otherwise readily deliverable by conventional systems to the desired location during the manufacturing process.

The item of hardware and method of making and bonding same is applicable to virtually any vehicle body opening that can be closed by a dielectric material which is capable of transmitting some percentage of visible light. Besides windshields, backlights and sidelights, roof lights, including sun roofs, moon roofs, and the like are within the scope of the invention. Such items of hardware can be bonded directly to the glass surface, or can be bonded to paints, ceramic frits, or other coatings applied to the glass for a variety of purposes.

Generally, it is desirable, to the extent possible, to minimize the "footprint" of items of hardware bonded to, for example, glass windows, in order to maximize the area of the window for outward vision of the vehicle operator and other occupants of the vehicle. Adhesive bonding of larger pieces of hardware does sometimes occur, however. As such, the amount of adhesive applied according to the invention, to one or multiple items of hardware can range from 0.5 g to 200 g, more commonly, from 2 g to 40 g.

A further advantageous feature of the one-component urethane adhesive of the invention is that upon exposure to heat at a temperature of 190° F. or greater, the adhesive cures rapidly, and achieves a high bond strength quickly. For example, a bond strength of ≥100 psi. by lap shear testing is achieved within a time period of from 1 minute to 2 minutes, preferably a time period of 0.5 minute to 1 minute.

While the invention has been described with reference to specific embodiments thereof, many alternatives, modifications, and variations will become apparent to those skilled in the art in light of the foregoing description. Accordingly, it is intended to embrace all such alternatives, modifications and variations as fall within the spirit and scope of the appended claims.

What is claimed is:

1. A method of adhesively bonding an item of hardware to a substrate comprising:
   providing an integral housing portion comprising:
      a hardware functional portion
      a housing peripheral portion extending from the hardware functional portion;
      a base plate contained in the housing peripheral portion and having one or more adhesion-enhancing openings formed therein, the base plate being oriented substantially parallel to the surface of the substrate to which it is to be adhesively attached;
      a continuous housing peripheral extension portion extending from the housing peripheral portion and circumferentially encompassing the base plate, the housing peripheral extension portion extending a predetermined distance beyond the base plate and being adapted to contact the substrate surface;
   applying an amount of an adhesive material to the surface of the base plate, or to the surface of a substrate to which the item of hardware is to be bonded; and
   bringing the item of hardware and the substrate surface into bonding contact, wherein the continuous housing peripheral extension portion contacts the substrate surface so as to contain the lateral extent of the adhesive material, while maintaining the base plate a predetermined vertical distance above the substrate surface so as to establish a nominal adhesive layer thickness between the base plate and the substrate surface.

2. The method defined in claim 1, wherein the adhesive material comprises:

a one-component polyurethane adhesive comprising at least one polymer polyol and at least one latently reactive component dispersed in the at least one polymer polyol, wherein the latently reactive component is present at a ratio of between 10 wt % and 90 wt % and 90 wt % to 10 wt %, relative to the at least one polymer polyol, the adhesive having an open time of 24 hours or more, and when subjected to heat at a temperature of 190° F. or greater, will cure to 40% of its final bond strength in 1 minute or less.

3. The method defined in claim 1, wherein the adhesive material comprises an acrylic adhesive.

* * * * *